United States Patent [19]

Johnson

[11] 3,868,124
[45] Feb. 25, 1975

[54] INFLATING DEVICE FOR USE WITH VEHICLE SAFETY SYSTEMS

[75] Inventor: James T. Johnson, Herrin, Ill.

[73] Assignee: Olin Corporation, New Haven, Conn.

[22] Filed: Sept. 5, 1972

[21] Appl. No.: 286,482

[52] U.S. Cl. ........... 280/150 AB, 102/37.7, 102/40, 141/4
[51] Int. Cl. ............................................. B60r 21/08
[58] Field of Search ....... 280/150 AB; 102/37.7, 39, 102/40; 23/281; 141/4

[56] References Cited
UNITED STATES PATENTS

| | | | |
|---|---|---|---|
| 3,618,976 | 11/1971 | Leising | 280/150 AB |
| 3,649,045 | 3/1972 | Smith | 280/150 AB |
| 3,663,036 | 5/1972 | Johnson | 222/5 |
| 3,674,059 | 7/1972 | Stephenson | 280/150 AB |
| 3,711,115 | 1/1973 | Lohr | 280/150 AB |
| 3,713,667 | 1/1973 | Blanchard | 280/150 AB |
| 3,718,332 | 2/1973 | Jones | 280/150 AB |
| 3,744,815 | 7/1973 | Scherenberg | 280/150 AB |
| 3,758,131 | 9/1973 | Stephenson et al. | 280/150 AB |

*Primary Examiner*—David Schonberg
*Assistant Examiner*—John P. Silverstrim
*Attorney, Agent, or Firm*—Donald R. Motsko; William W. Jones; H. Samuel Kieser

[57] ABSTRACT

An apparatus for use in safety systems of the type utilizing an inflatable safety member, a stored fluid under pressure and a propellant for the generation of hot gas. The apparatus includes storage means for storing a fluid under pressure and propellant storage means for storing at least two distinct propellant charges. Only one of the charges is ignited when slow deployment of the system can be tolerated while all charges are ignited when fast deployment of the system is required. In either mode of operation, the hot gas generated by the burning of the propellant augments the stored fluid to inflate the inflatable safety member.

3 Claims, 3 Drawing Figures

INFLATING DEVICE FOR USE WITH VEHICLE SAFETY SYSTEMS

BACKGROUND OF THE INVENTION

The present invention relates generally to the field of vehicle safety systems of the type utilizing an inflatable confinement. More particularly, this invention relates to an improved inflating system for inflating the confinement of such devices.

A great deal of effort is being given to the problem of increasing the safety of passenger vehicles. As well as trying to increase the safety of the vehicle itself, considerable effort is being given to the development of passive restraint systems which will protect the occupant of the vehicle from injury due to impact without the necessity of the occupant taking any positive action.

One type of passive restraint system which has been developed utilizes an inflatable confinement such as a bag which is automatically inflated in response to a predetermined condition such as an impact to or the upsetting of the vehicle to protect the occupant from contacting the interior of the vehicle and injuring himself.

The present invention is concerned with a vehicle safety system of the type which utilizes an inflatable confinement means, a stored fluid under pressure, and a propellant charge for the generation of hot gas. When a collision of the vehicle is sensed, the propellant charge is ignited and the hot gas resulting therefrom mixes with the stored fluid and the mixture released to inflate the confinement. In some instances it has been found that the rapid deployment of safety bags creates a loud noise and unnecessary discomfort to the passenger.

SUMMARY OF THE INVENTION

The present invention has for its object an inflation device for safety bags wherein the bag is deployed at slow rates for low speed crashes and at a higher rate for higher speed crashes.

Another object of the present invention is to provide an inflation device for inflating confinements of vehicle safety systems which has better noise control and reduced passenger discomfort.

In accordance with the present invention, these and other objects and advantages are accomplished through the provision of a storage means for storing a fluid under pressure and a propellant storage means for storing at least two distinct propellant charges. Only one of the charges is ignited when slow deployment of the system can be tolerated while all charges are activated when fast deployment of the system is required. The hot gas generated by the propellant in either slow or fast modes of operation serves to augment the stored fluid to inflate an inflatable safety member.

The two mode structure and operation of this invention differs in concept, operation and structure from the dual chamber but single mode structure disclosed and claimed in copending application Ser. No. 284,481 filed Sept. 5, 1972, by Lester E. Smith et al. In the Smith et al. application, two propellant charges are loaded into separate chambers and fired by an electrical impulse transmitted by a single sensing unit. The charges are connected to a delay ignition mechanism in the electrical circuit to fire the charges sequentially thereby reducing the rate of burn and the ultimate peak pressure which would be experienced if the same amount and type of propellant charge were ignited in a single chamber. In the Smith et al. structure, both propellant charges are ignited under all crash conditions and all charges respond to the same single crash sensing mechanism.

In the present invention the two propellant chambers are connected to different sensors which are set to sense conditions of different severity. In a low level crash only one charge is ignited and there is a deployment of the air bags responsive to such a condition. In a severe crash both sensors are actuated which in turn actuate both propellant charges and there is a fast deployment of the air bags responsive to the sensed severe conditions.

DETAILED DESCRIPTION

Figure 1:
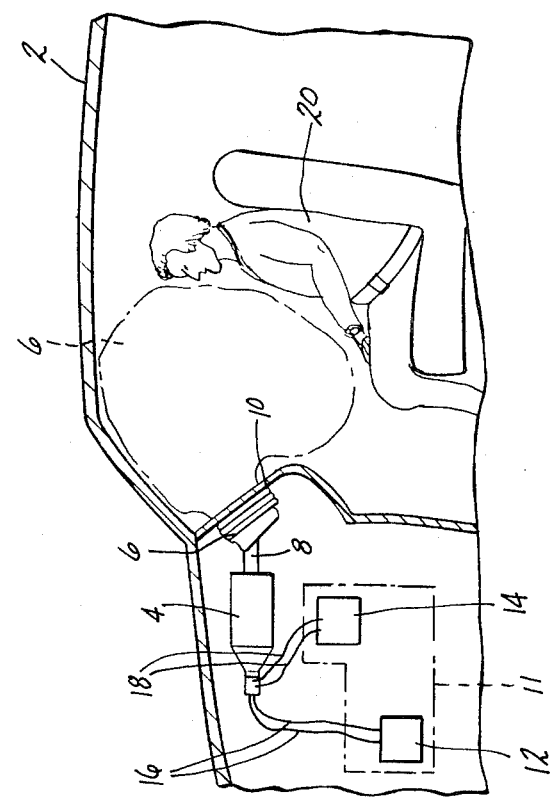
FIG. 1 is a partially broken away, fragmentary, side view of a vehicle equipped with a safety device incorporating the present invention and showing one arrangement of such a system in the vehicle.

Referring to the drawings, and in particular to FIG. 1, a system incorporating the present invention is shown mounted in a vehicle 2. The system includes an inflating unit 4 connected to an inflatable confinement 6 by means of a manifold 8. The confinement 6, in the example shown, is mounted in the dashboard 10 of the vehicle 2 in its deflated or collapsed storage position. The confinement 6 may be in the form of a flexible bag of rubber, cloth, or the like and may be vented in any known manner or non-vented if desired.

Collision sensing means 11, which may include two sensors 12 and 14 or other means for sensing high and low speed crashes are attached to the vehicle 2. The sensing means 11 is connected to the inflator 4 by suitable electric connectors 16 and 18 respectively. The sensors 12 and 14 are of the type which will produce an electric current when the vehicle is involved in a collision of a predetermined magnitude. The electric current from one or both of the sensors 12 and 14 serves to actuate the inflator 4 which in turn inflates the confinement 6 into its expanded condition as indicated at 6' to provide a soft cushion against which the occupant 20 of the vehicle 2 will impact.

Figure 2:
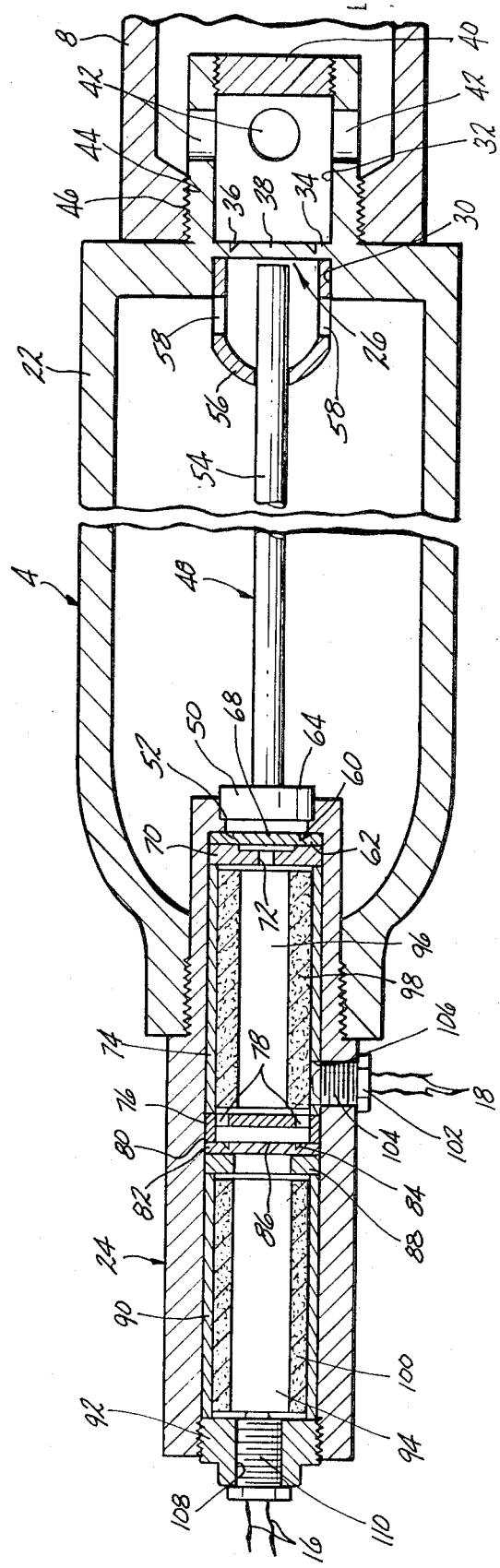
FIG. 2 is a cross-sectional view of the inflating unit incorporating the present invention.

The inflating unit 4 which is shown in greater detail in FIG. 2, comprises a fluid storage reservoir 22 in the shape of an elongated bottle fabricated from a high strength material such as steel, aluminum, or the like. The forward, or left hand end as viewed in FIG. 2 is reduced to the bottle like shape and is closed by a propellant storage means 24. The rearward end is closed by an integral portion of the reservoir 22 which forms an outlet portion 26. The outlet portion 26 of the reservoir 22 includes a rearward extension portion 28 formed integrally with the remainder of the reservoir 22. A recess or bore 30 extends rearwardly in the outlet portion 26 with its open end communicating with the interior of the reservoir 22. The bore 30 is separated from a bore 32 in the extension portion 28 by a web 34. The web 34 is provided with a circular groove 36 which provides a rupturable closure portion 38 closing the interior of the reservoir 22 from the manifold 8 and bag or inflatable confinement 6.

The bore 32 in the outlet portion 26 of the reservoir 22 has its open end closed by a plug 40 threadedly secured thereto. The walls defining the bore 32 have a plurality of apertures 42 therein, each aperture having an axis substantially perpendicular to the axis of the bore 32. The apertures 42 serve to diffuse the exiting gases and are so dimensioned so as to prevent the rupturable closure portion 38 from passing through the manifold 8 in the confinement 6 after portion 38 has been severed from the web 34. The manifold 8 is connected to the outlet 26 by means of an internally threaded portion 44 being connected to the threaded portion 46 of the rearward extension portion 28.

A rod member 48 extends from the inner end of the propellant storage means 24 to the bore 30 and terminates at a point slightly spaced from the rupturable closure portion 38. The rod member 48 includes an enlarged head portion 50 mounted in a counterbore 52 in the end of the propellant storage means 24. The elongated reduced portion 54 of the rod member 48 is supported adjacent its free end by a deflector member 56 which has a plurality of apertures 58 therein, the axis of which are perpendicular to the axis of the outlet portion 26.

The propellant storage means 24 is designed to house two distinct propellant charges. The end of the propellant storage means 24 which extends into the reservoir 18 is open and has a shoulder 60 therein against which a burst disc 62 is positioned. The burst disc 62 has a circular groove 64 therein to provide a rupturable closure portion 68. Immediately behind the burst disc 62 is a nozzle member 70 which has a suitable orifice 72 therein. A spacing sleeve member 74 extends from the nozzle member 70 toward the outer end of the propellant storage means 24. A burst disc catching member 76, provided with a plurality of apertures 78, abuts the other end of the spacing sleeve 74. The burst disc catching member 76 is provided with a rearwardly extending flange 80 against which a second burst disc 82 abuts. The burst disc 82 is provided with a circular groove 84 which forms a rupturable closure portion 86. A burst disc support member 88 is positioned against the other side of the burst disc 86. A second sleeve member 90 extends from the burst disc support member 88 to a plug member 92 which closes the outer end of the propellant storage means 24.

The area defined by sleeve 74, nozzle member 70 and burst disc 82 forms a primary propellant chamber 94 in which is housed a suitable propellant. The area defined by sleeve 90, burst disc 82 and plug 92 forms a secondary propellant chamber 96. Both of these chambers are filled with a suitable propellant charge 98 and 100 respectively. Both propellant charges may be of any suitable type capable of generating a hot non-toxic gas when ignited and/or mixed with the fluid of the reservoir. The propellant charges may be in the form of loose powder, a single gas generating grain, or a plurality of large grains.

The interior of the reservoir 22 is filled with a nontoxic fluid under pressure. The fluid may be air, oxygen, nitrogen, argon, helium, other non-toxic fluids, or mixtures thereof which can be stored under pressure.

An ignitor member 102, such as a squib member mounted in a suitable threaded housing, is secured to a threaded bore 104 in the side wall of a propellant storage means 24. An aperture 106 is provided in sleeve 74 so that the igniter member will communicate with the primary propellant charge 98 in the primary propellant storage chamber 94 and cause the ignition thereof when the ignitor member 102 is subjected to a suitable electric current passing through its electric connectors 18.

The plug 92 is provided with a threaded bore 108 in which is threadedly secured a second ignitor member 110, such as a squib mounted in a suitable threaded housing. The ignitor member 110 communicates with the secondary propellant charge 100 in the secondary propellant chamber 96 so that it will cause the ignition thereof when the ignitor 110 is subjected to an electric current passing through its electrical leads 16.

The leads 18 from ignitor member 102 connected with the primary propellant charge 98 are connected to a low level suitable crash sensor 14. By way of example, in the case of an automobile accident, this sensor should be able to sense a crash in the magnitude of 15 to 20 miles per hour and actuate the ignitor member 102 to ignite the propellant charge 98. The leads 16 coming from the ignitor member 110 associated with the secondary propellant charge 100 are attached to a high level sensor 12 of any suitable type. By way of example, the high level sensor should be capable of being activated at any crash speed above 20 miles per hour to fire the ignitor member 110 and ignite the secondary propellant charge 100.

In the event of a low level crash where a low deployment rate of the confinement can be tolerated, only the low level sensor 14 is activated which fires ignitor member 102 to ignite the primary propellant charge 98. The pressure due to the generation of the gas from the ignition of the primary propellant charge 98 in the primary propellant chamber 94 causes rupture of the rupturable closure portion 68 of the burst disc 62 and also causes the push rod 48 to move to the left as viewed in FIG. 2 to impact against and rupture the rupturable closure portion 38 in the chamber outlet 26. The propellant gases flow into the interior of the reservoir 22 and heat and mix with the stored fluid contained therein. The mixture of the hot gas and stored fluid exit through the apertures 58 in the deflector member 56, through apertures 42 in the rearward extension portion 28 into manifold 8 where they are directed into the interior of confinement 6 to cause the inflation thereof.

In the event that the crash is high level and a high deployment rate of the confinement is needed, in addition to the activation of the low level sensor, the high level sensor 12 will fire the ignitor member 110 which in turn will ignite the secondary propellant charge 100. The pressure in the secondary propellant chamber 96 will cause the rupture of the rupturable closure portion 86 of burst disc 84 whereby the gases generated by the burning of the propellant charge 100 will pass through the primary propellant chamber 94 through nozzle member 70 into the interior of the reservoir 22. The rupturable closure portion 86 is prevented from escaping into the interior of the reservoir 22 by virtue of the fact that it is caught by the catching member 76.

The low level sensor 14 should activate the ignitor member 102 in between 5 and 15 milliseconds depending on the speed of the automobile. The high level sensor should activate the ignitor member 110 in between 20 and 30 milliseconds depending upon the speed of the automobile. Thus, in the event of a high level crash, the primary propellant charge 98 in the primary propellant chamber 94 would be ignited prior to the ignition of the secondary propellant charge 100. Due to the fact that the outlet 26 is opened upon the rupturing of the rupturable closure portion 68 by the burning of the primary propellant charge 98, the hot gas will mix with the stored fluid in the reservoir 22 and some of the mixture will exit from the reservoir 22 before the gas generated by the burning of the secondary propellant charge enters the reservoir 22. This reduces the peak pressure in the reservoir 22 during the high level mode of operation.

It is found that although the degree of augmentation of the stored fluid with energy from the propellant charge is dependent upon the bag volume, low level crash speed and other factors, it appears that low level augmentation in the range of 40–60 percent is desirable; that is 40–60 percent of the combined total propellant should be utilized in a low level crash.

Figure 3:
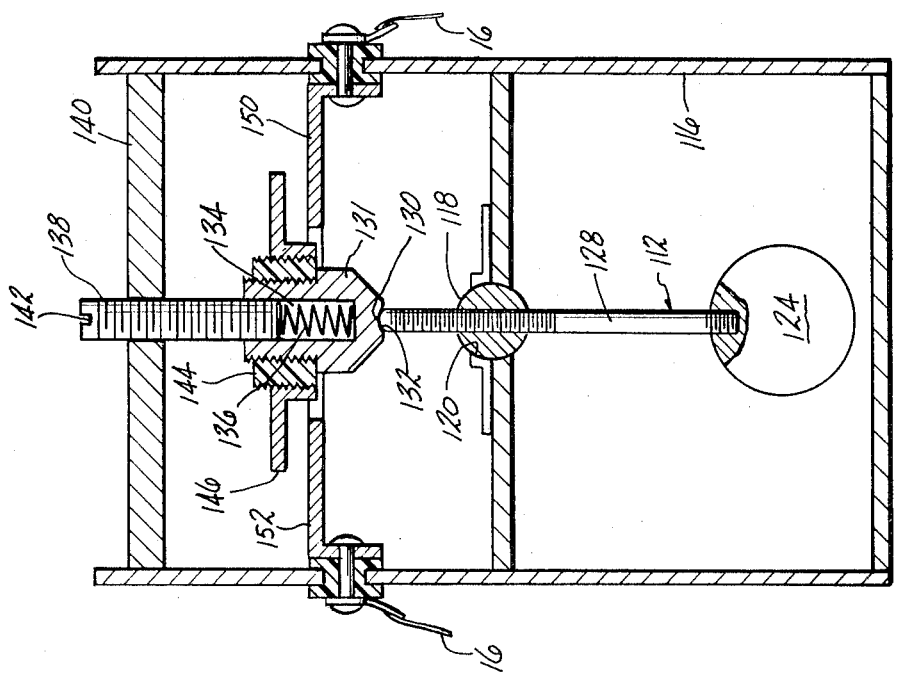
FIG. 3 is a cross-sectional view of a sensor which is representative of a sensor that can be used with the present invention.

FIG. 3 discloses a typical sensor that could be used with the present invention and is included here only for example purpose. A pendulum 112 is mounted in the center of a partition 114 in a housing 116 for free swinging movement through 360° by means of a ball 118 fitted in a socket 120. The pendulum 112 includes a supporting shaft 128 which is fitted into the ball 118 and threadedly secured thereto. A weighted ball member 124 is threadedly attached to the bottom end of the supporting shaft 128. The upper end portion of the supporting shaft 128 extends through the ball 118 and has its upper end 130 curved.

A member 131 is provided with concave face 132 in engagement with the end 124 of the supporting shaft 128. The member 131 has a bore 134 extending into it which is mounted a spring member 136. The member 131 is telescoped over the lower end of a threaded shaft 138 which is threadedly connected to an upper partition member 140. The shaft 138 is provided with slot 142 for the reception of a suitable instrument to rotate it so that it can move up and down and vary the pressure that the spring exerts on the member 131 which in turn varies the amount of pressure the concave face 132 exerts against the end 130 of the shaft 128. An insulating sleeve 144 is connected to and surrounds the upper portion of the member 130. A circular annulus 146 is attached to the insulating sleeve 144.

An electrical connector 150 which is insulated from the housing 116 extends inwardly from the side wall of the housing 116 to a point where it is positioned underneath the annulus 146 but spaced therefrom in the direction of the axis of member 131. A separate electrical connector 152 insulated from and diametrically opposed to electrical connector 150 extends inwardly from the side wall of the housing 116 to a point where it is positioned underneath the annulus 146 and also spaced therefrom in the axis of member 130. The electrical connector 150 is electrically connected to a lead wire, such as one of the two lead wires going to ignitor 102 or ignitor 110. Electrical connector 152 is connected to a lead wire which would be second of the two leads wires going to ignitor 102 or ignitor 110. Obviously, a suitable voltage source is provided in the electric circuit.

The sensor described above can be preset to operate at or upon the application of any predetermined force. When the sensor senses the predetermined force such as the force due to rapid deaccelleration of the vehicle due to a collision, the pendulum 112 will swing about socket 120 whereupon the end 130 of the shaft 112 will move out of contact with the concave face 132 of member 131, whereby member 131 along with the annulus 146 will be released and urged downwardly by the spring member 136 to provide an electrical connection between electrical connectors 150 and 152. This will close the circuit and send a current through lead wires to actuate one ignitor of the device heretofor described.

Sensors similar to that described above can be used in the system of the present invention. One sensor can be preset to operate in the range of a low level crash to activate the low level mode of operation to cause the firing of ignitor 102. A second sensor can be preset to operate at the high level mode of operation and cause the firing of ignitor 110.

It is contemplated that other types of sensors could be utilized with the present invention. A "bumper-switch" could be used to initiate the low level mode of operation. Other types of sensing devices such as accelerometers, inertia responsive devices, or other types well known in the prior art could be used. It is also contemplated that other sensing means such as a single sensor which would actuate only the low level electrical circuit including leads 18 at low level crashes, but would actuate both the low and high level electrical circuits including both leads 16 and 18 in response to a high level crash with a time delay between the low level actuation and high level actuation built into the electric circuit or into the ignitor members.

By virtue of the present invention, a dual level inflating unit is provided for use in inflating inflatable safety confinements. Under low speed crash conditions, the confinement is inflated at a slower rate with a reduction in the noise level and discomfort to the occupants. When a high speed crash occurs, the inflating unit is capable of inflating the confinement at a faster rate to ensure the occupant is properly protected.

What is claimed is:

1. An apparatus for use in connection with safety systems of the type including an inflatable member, a stored fluid under pressure, and a propellant for the generation of hot gas, said apparatus including:
   a. storage means for storing a fluid under pressure and including a closed outlet;
   b. propellant storage means for storing at least two distinct propellant charges in separate propellant chambers;
   c. a propellant charge in each of said propellant chambers;
   d. means for igniting only one of said propellant charges in response to the sensing of a condition wherein slow deployment of the system can be used, and for causing the ignition of all of said propellant charges in response to the sensing of a condition wherein fast deployment of the system is required;
   e. means providing communication between each of said propellant chamber and said storage means if the propellant charge therein is ignited; and
   f. means operable when the system is actuated to open the outlet and permit the propellant gas and stored fluid to escape from said storage means.

2. The apparatus of claim 1 wherein said propellant storage means includes an axially extending housing attached to said storage means, means in said housing dividing the interior thereof into a primary propellant chamber adjacent one end and a secondary propellant chamber adjacent the other end, means at said one end for sealing said primary chamber from the interior of said storage means and operable upon the development of a predetermined pressure in said primary chamber after ignition of the propellant charge therein to unseal said chamber, said means in said housing dividing the interior thereof including means operable upon development of a predetermined pressure in said secondary chamber after ignition of said propellant charge to provide communication between said secondary and said primary propellant chambers, said meaans for igniting said propellant charges including means for igniting the propellant charge in said primary propellant chamber in response to the sensing of a condition wherein slow deployment of the system is desired and igniting the propellant charges in both said primary and secondary chambers in response to the sensing of a condition wherein fast deployment of the system is desired.

3. The apparatus of claim 2 wherein said means for igniting said propellant charges include a first ignitor communicating with the propellant charge in said primary propellant chamber and a second ignitor communicating with the propellant charge in the secondary propellant chamber.

* * * * *